US006980986B1

(12) United States Patent
Lawrence et al.

(10) Patent No.: US 6,980,986 B1
(45) Date of Patent: Dec. 27, 2005

(54) SYSTEM AND METHOD FOR BOOKMARK SET SEARCH AND EXECUTION REFINEMENT

(75) Inventors: Kelvin Roderick Lawrence, Round Rock, TX (US); Edward L. Kunzinger, III, Round Rock, TX (US); Herman Rodriguez, Austin, TX (US); Jay A. Tunkel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 09/439,052

(22) Filed: Nov. 12, 1999

(51) Int. Cl.[7] .............................................. G06F 17/30
(52) U.S. Cl. ...................... 707/5; 707/2; 707/3; 707/10
(58) Field of Search .......................... 707/5, 10, 513, 707/514; 709/203, 219

(56) References Cited

U.S. PATENT DOCUMENTS

| | | | | |
|---|---|---|---|---|
| 5,592,375 A | * | 1/1997 | Salmon et al. .............. | 395/207 |
| 5,715,443 A | | 2/1998 | Yanagihara et al. ........ | 395/603 |
| 5,724,567 A | | 3/1998 | Rose et al. ................. | 395/602 |
| 5,768,581 A | | 6/1998 | Cochran ..................... | 395/615 |
| 5,826,261 A | | 10/1998 | Spencer ........................ | 707/5 |
| 5,845,278 A | | 12/1998 | Kirsch et al. .................. | 707/3 |
| 5,855,015 A | | 12/1998 | Shoham ........................ | 707/5 |
| 5,873,107 A | | 2/1999 | Borovoy et al. ............ | 707/501 |
| 5,886,698 A | * | 3/1999 | Sciammarella et al. ..... | 345/769 |
| 5,987,457 A | * | 11/1999 | Ballard ........................... | 707/5 |
| 6,182,068 B1 | * | 1/2001 | Culliss .......................... | 707/5 |

FOREIGN PATENT DOCUMENTS

| | | | | |
|---|---|---|---|---|
| WO | WO9516956 | 6/1995 | ............. | G06F/9/46 |
| WO | WO9523371 | 8/1995 | ............. | G06F/7/00 |

OTHER PUBLICATIONS

Hajime Takano and Terry Winograd; Dynamic Bookmarks for the WWW Managing Personal Navigation Space by Analysis of Link Structure and User Behavior Copyright ACM 1998; Downloaded Nov. 7, 2001.*
IBM Technical Disclosure Bulletin vol. 39 No. 09, Sep. 1996, Utilize Information Accumulated in Gateway.ppg 61.
IBM Technical Disclosure Bulletin vol. 39 No. 05, May 1996, Simple Web Indexing Facility. p. 91.
IBM Technical Disclosure Bulletin, vol. 38 No. 05, May 1995, Resolver Library Routines, pp. 145–148.

* cited by examiner

Primary Examiner—Alford Kindred
Assistant Examiner—Leslie Wong
(74) Attorney, Agent, or Firm—Paul D. Heydon; David A. Mims Jr.

(57) ABSTRACT

The refinement of existing search output. The present invention further improves upon the prior art in that: (1) it provides a means for employing the automation of the selection process; (2) it further provides for the elimination of the need to manually reformulate the search, which is very tedious; and (3) the use of weighted logic processes to refine the search.

3 Claims, 3 Drawing Sheets

SYSTEM AND METHOD FOR BOOKMARK SET SEARCH AND EXECUTION REFINEMENT

TECHNICAL FIELD

World Wide Web ("Web") searches based on search engines, e.g. the search engine with the trademark YAHOO™, or the search engine with the trademark ALTA VISTA™, often produce search results which are more extensive or broader than desired. Refining the search typically requires the reformulation of the original search to add or subtract search criteria from the search syntax.

Refining the search syntax is a subjective operation which may or may not result in a more properly targeted search; but, in any case, is dependent entirely on the judgment of the researcher who must reformulate the syntax based on the, perhaps extensive, list of search results provided by the browser. Therefore, the prior art does not describe a solution to this problem; in the context of Web searches, except as a tedious manual process.

BACKGROUND OF RELATED ART

The 1990's decade has been marked by a societal technological revolution driven by the convergence of the data processing industry with the consumer electronics industry. This advance has been even further accelerated by the extensive consumer and business involvement in the Internet over the past two years. As a result of these changes, it seems as if virtually all aspects of human endeavor in the industrialized world requires human-computer interfaces. As a result of these profound changes, there is a need to make computer directed activities accessible to a substantial portion of the world's population, which, up to a year or two ago, was computer-illiterate or, at best, computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

It is well known to connect a plurality of computer systems into a network of computer systems. In this way the collective resources available within the network may be shared among users, thus allowing each connected user to enjoy resources which would not be economically feasible to provide to each user individually. With the growth of the Internet, sharing of computer resources has been brought to a much wider audience; it has become a cultural medium in today's society for both information and entertainment. Government agencies employ Internet sites for a variety of informational purposes. For many companies, their Internet sites are an integral part of their business; they are frequently mentioned in their companies's TV, radio and print advertising.

The WEB is the Internet's multimedia information retrieval system. It is the most commonly used method of transferring data in the Internet environment. Additional methods include the File Transfer Protocol (FTP) and Gopher. Client machines accomplish transactions to the Web servers using the Hypertext Transfer Protocol (HTTP), which is a known application protocol providing users access to files (e.g. text, graphics, images, sound and video) using a standard page description language known as Hypertext Markup Language (HTML). HTML provides basic document formatting and allows the developer to specify "links" to other servers and files. The Internet paradigm, a network path to a server, is identified by a Uniform Resource Locator (URL) having a special syntax for defining a network connection.

Retrieval of information is generally achieved by use of a HTML compatible "Browser", e.g., Netscape Navigator™, at a client's machine. When the user of the browser specifies a link via a URL, the client issues a request to a naming service to map a host name in the URL to a particular Internet Protocol (IP) address at which the server is located. The naming service returns a list of one or more IP addresses that can respond to the request. Using one of the IP addresses, the browser establishes a connection to a server. If the server is available, it returns a document or other object formatted according to HTML.

One of the most common and frequently one of the most disappointing activities performed on the Internet is searching among a plethora of information available at various Web servers for the particular information in which the user is interested. There are a variety of research engines available including the search engine with the trademark ALTA VISTA™, the search engine with the trademark LYCOS™ and the search engine with the trademark HOTBOT™, as well as various search engines attached to the individual Web servers themselves.

One of the difficulties is that the formation of a search argument is a difficult task for many users. The quality of the search is thus dependent upon the skill and vocabulary of the user. In many cases, even with such mastery it is difficult to properly anticipate the exact words which will be used by the writers of a particular document. The addition of a thesaurus would be helpful, but in many cases the vocabulary is technical or specialized and would simply not be found in a general purpose thesaurus. The result of much of an Internet search could most charitably be called "useless". Yet among this useless information, there are generally some pearls. The user, upon reading such a document, recognizes its worth to his desires and wishes, typically futile, that he could have more documents like this. He could manually look at the document and attempt to formulate a new search using new words in the desired document. The new search might be better or similarly dismal to the first.

It would be preferable to provide a user a convenient means to quickly refine an Internet search with a minimum of manual search formulation and keyboard input. This present invention addresses this point.

SUMMARY OF THE PRESENT INVENTION

The present invention relates to information retrieval in a data processing system. More particularly, it improves upon the prior art in that: (1) it provides a means for employing the automation of the selection process; and (2) it further provides for the elimination of the need to manually reformulate the search which is a very tedious and (3)use of weighted logic processes to refine the search.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Definitions

Before going into the details of the present invention, the following definitions are in order.

Bookmark: A marker inserted at a specific point in a document to which the user may wish to return for later reference. In Netscape Navigator™, a link to a Web page or other URL that a user has stored in a local file in order to return to it later.

URL: Acronym for Uniform Resource Locator. This represents an address for a resource on the Internet. URLs are used by Web browsers to locate Internet resources. An URL specifies the protocol to be used in accessing the resource (such as an "http:" for a Web page or a "ftp:" for a FTP site) and the name of the server on which the resource resides (such as "//www.whitehouse.gov"). Search Engine: Is a program that searches for key data words in documents or in a database. On the Internet, it is program that searches for keywords in a file and in documents found on the Web, news groups, Gopher, menus and FTP archives.

Web Browser: A client application that enables a user to view HTML documents on the Web, another network or a user's computer, follow the hyperlinks among them and transfer files.

Figure 1:
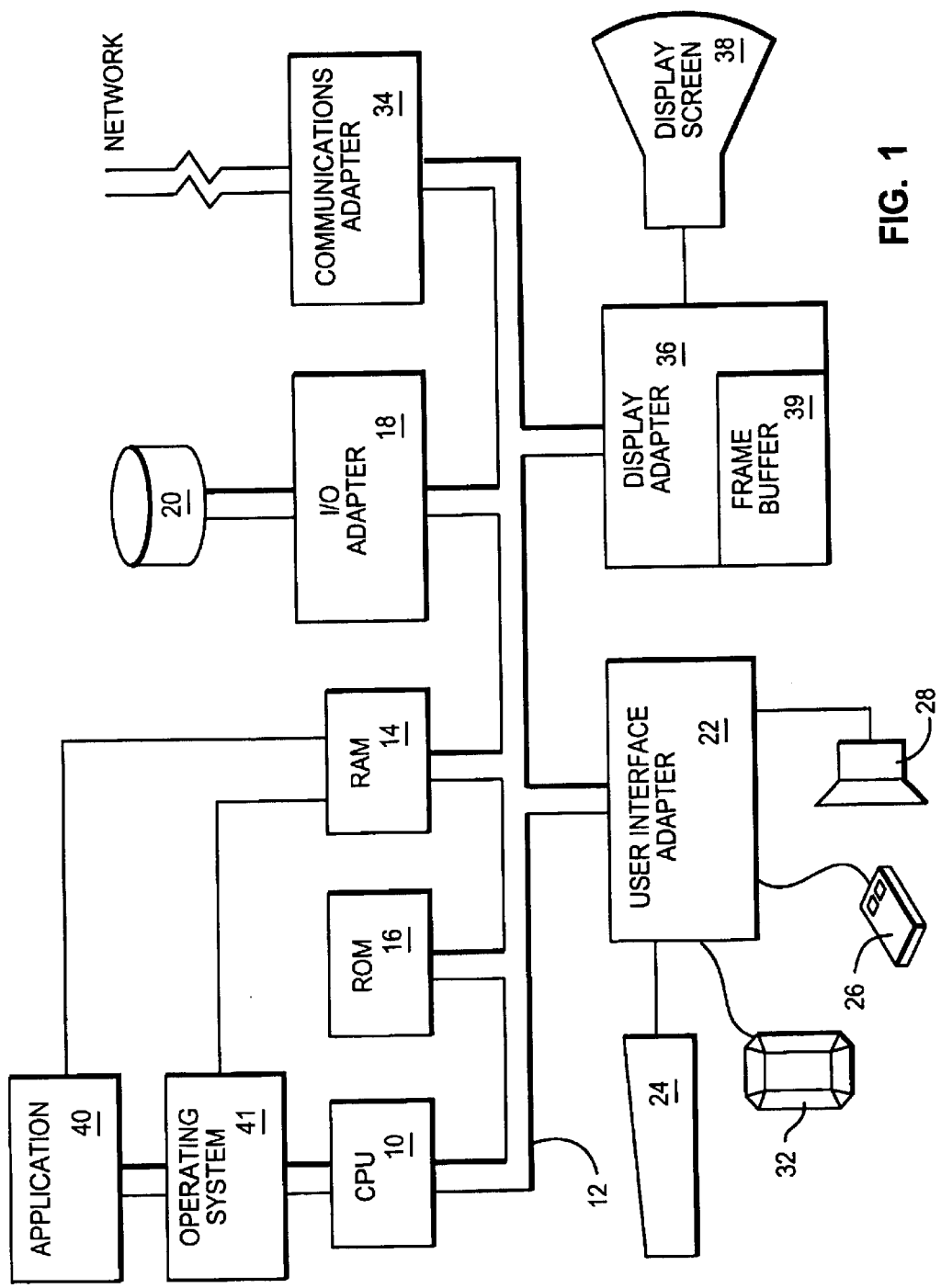
FIG. 1 is provided merely for background and represents a general block diagram of a computer data processing system including a central processing unit (CPU) and network connections via a communications adapter which is capable of implementing the present invention.

For purposes of general computer background only, FIG. 1 is presented. It merely represents a typical block diagram of a data processing system including a central processing unit (CPU) and network connections via a communications adapter which is capable of implementing the present invention. A CPU, such as one of the PowerPC™ microprocessors available from International Business Machines Corporation (IBM) (PowerPC is a trademark of IBM), is provided and interconnected to various other components by system bus 12. An operating system 41 runs on CPU 10 and provides control and is used to coordinate the function of the various components of FIG. 1. Operation system 41 may be one of the commercially available operating systems such as DOS, or the OS/2™ operating system available from IBM (OS/2 is a trademark of IBM). A program application 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and application 40, are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26, and receiving output information from the system and display 38.

There will now be described a simple illustration of the present invention with respect to FIG. 2. It represents a very general flowchart for the operation of the present invention, bookmark set search and execution refinement. As noted above, the present invention is far superior to the prior art in that there is automation of the selection process, elimination of the need to manually reformulate the search syntax. It also involves the use of weighted logic processes to refine the search.

Figure 2:
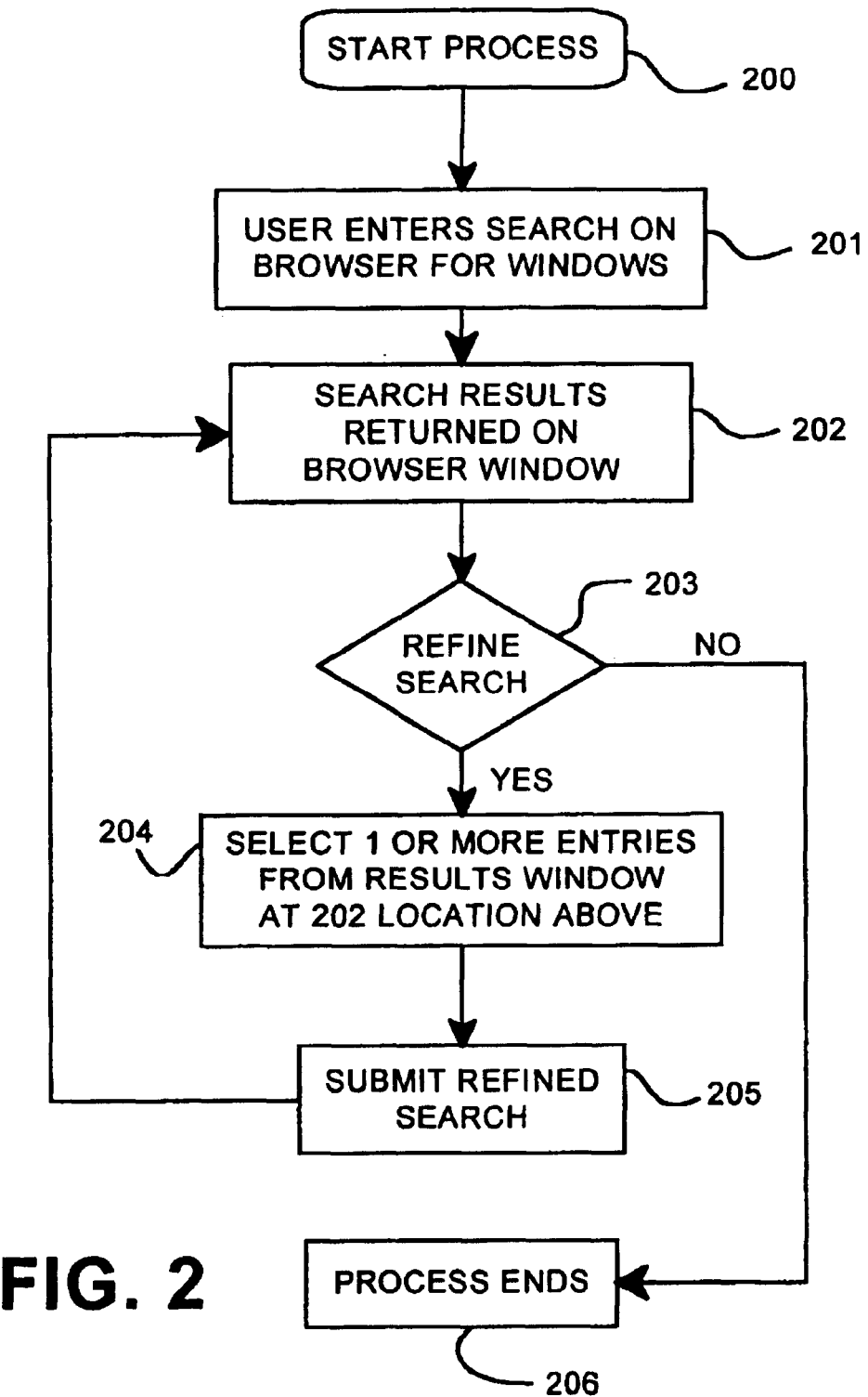
FIG. 2 represents the general view of the flowchart for the present invention's "bookmark set search and execution refinement"

Turning to FIG. 2, the process is started at 201 where the searcher enters a search on a typical Browser (i.e. Browser for Windows). The search results are then returned to the Researcher on Browser Window at 202. The query is then raised at location 203, after the Researcher reviews the results of 202 as to whether they require further refinement of the results. If the Researcher is satisfied and no further refinement is needed and the response is NO to whether or not further refinement is needed, then the process is ended at location 206 and no further refinement is required. However, if the answer to 203 is YES, then at 204 the user selects one or more entries from the results window at the 202 location above, and at 205 submits them; the process is returned to location 202 and repeated until the desired refinement is attained.

Figure 3:
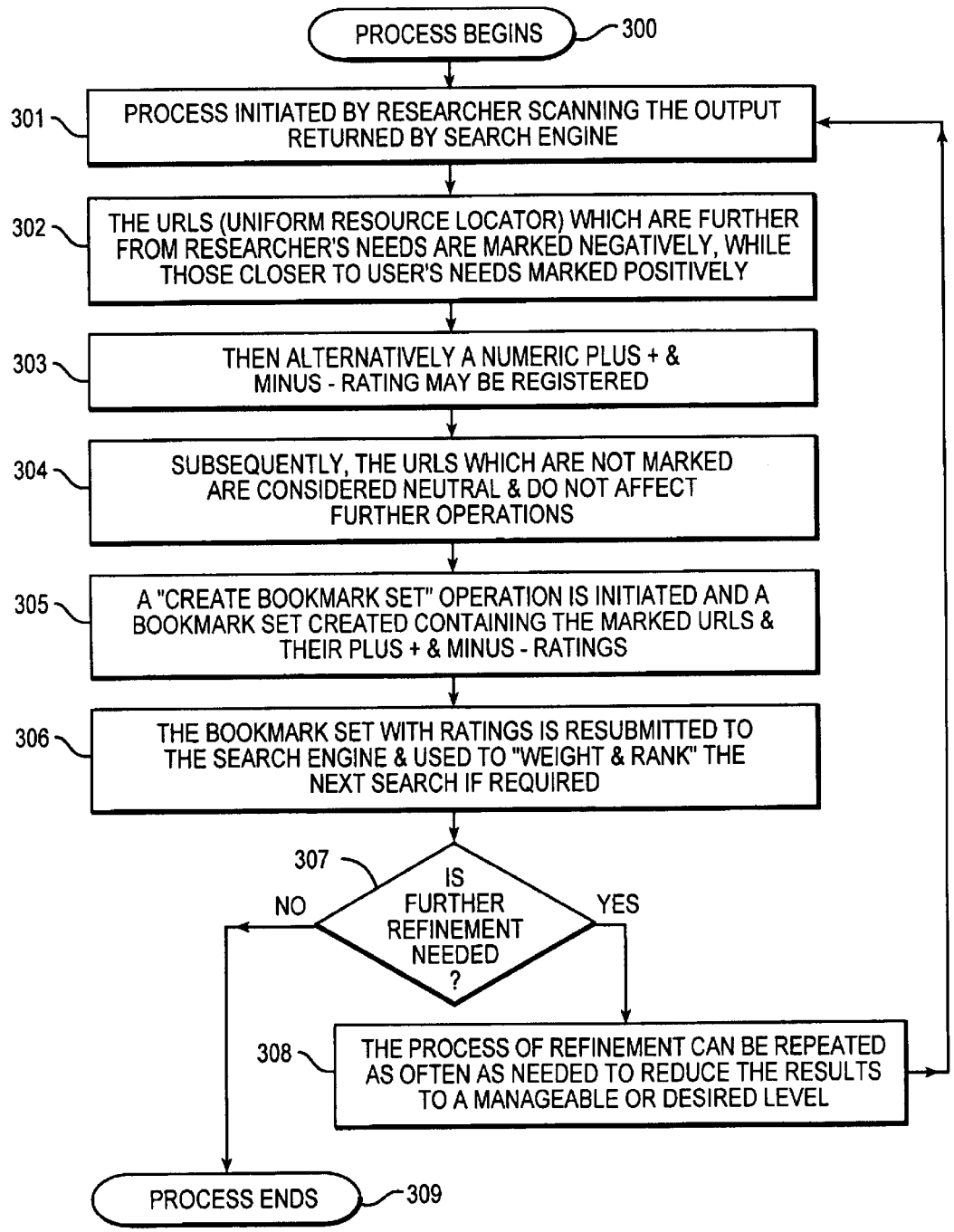
FIG. 3 represents the actual detailed process of the present invention involving the refinement of existing search output.

The actual detailed process of the present invention which involves the refinement of existing search output is detailed in FIG. 3. The process begins at location 300. Initially, the researcher scans the output returned by the search engine at FIG. 3, location 301. The URLs which are closer to the user's needs are marked positively and the URLs which are furthest from the user's needs are marked negatively at location 302. Then a numeric + or − rating may be registered at 303. The URLs which are not marked are considered neutral and do not affect further operations at 304.

A "create bookmark set" operation is initiated and a bookmark set is created which contains the marked URLs at 305 (and their Plus + or Minus − rating). Subsequently, the bookmark set with ratings is resubmitted to the search engine and is used to "Weight and Rank" the next search at 306. The query is then raised as to whether further search refinement is required at location 307. If the answer is NO at 307, then the process ends at 309. If the answer to 307 is YES, then the process moves on to 308 which states that the process can be repeated as often as needed to reduce the results to a manageable desired level. Thus, the process can again be repeated at 301.

The process of refinement can be repeated as often as needed to reduce the result set to a manageable or desirable level.

While the invention has been shown and described with reference to particular embodiments thereof, it will be understood by those skilled in the art that the foregoing and other changes in form and detail may be made therein without departing from the spirit and scope of the invention.

What is claimed is:

1. A computer based method for search refinements, said method comprising:

(a) marking URL's positive or negative regarding whether a user's needs are met by search results, while URL's remaining unmarked are neutral;

(b) creating a bookmark set which includes said marked URL's and said positive or negative markings;

(c) submitting said bookmark set to a search engine; and (d) repeating (a)–(c) as often as said user desires, to refine said search results to a manageable level.

2. A system for search refinements, said system comprising:

(a) means for marking URL's positive or negative regarding whether a user's needs are met by search results, while URL's remaining unmarked are neutral;

(b) means for creating a bookmark set which includes said marked URL's and said positive or negative markings;

(c) means for submitting said bookmark set to a search engine; and (d) means for repeating (a)–(c) as often as said user desires, to refine said search results to a manageable level.

3. A computer-usable medium having computer-executable instructions for search refinements, said computer-executable instructions comprising:

(a) means for marking URL's positive or negative regarding whether a user's needs are met by search results, while URL's remaining unmarked are neutral;

(b) means for creating a bookmark set which includes said marked URL's and said positive or negative markings;

(c) means for submitting said bookmark set to a search engine; and (d) means for repeating (a)–(c) as often as said user desires, to refine said search results to a manageable level.

* * * * *